April 1, 1924. 1,489,173
W. A. TAYLOR
NONSKID WHEEL
Filed Oct. 25, 1921  3 Sheets-Sheet 1
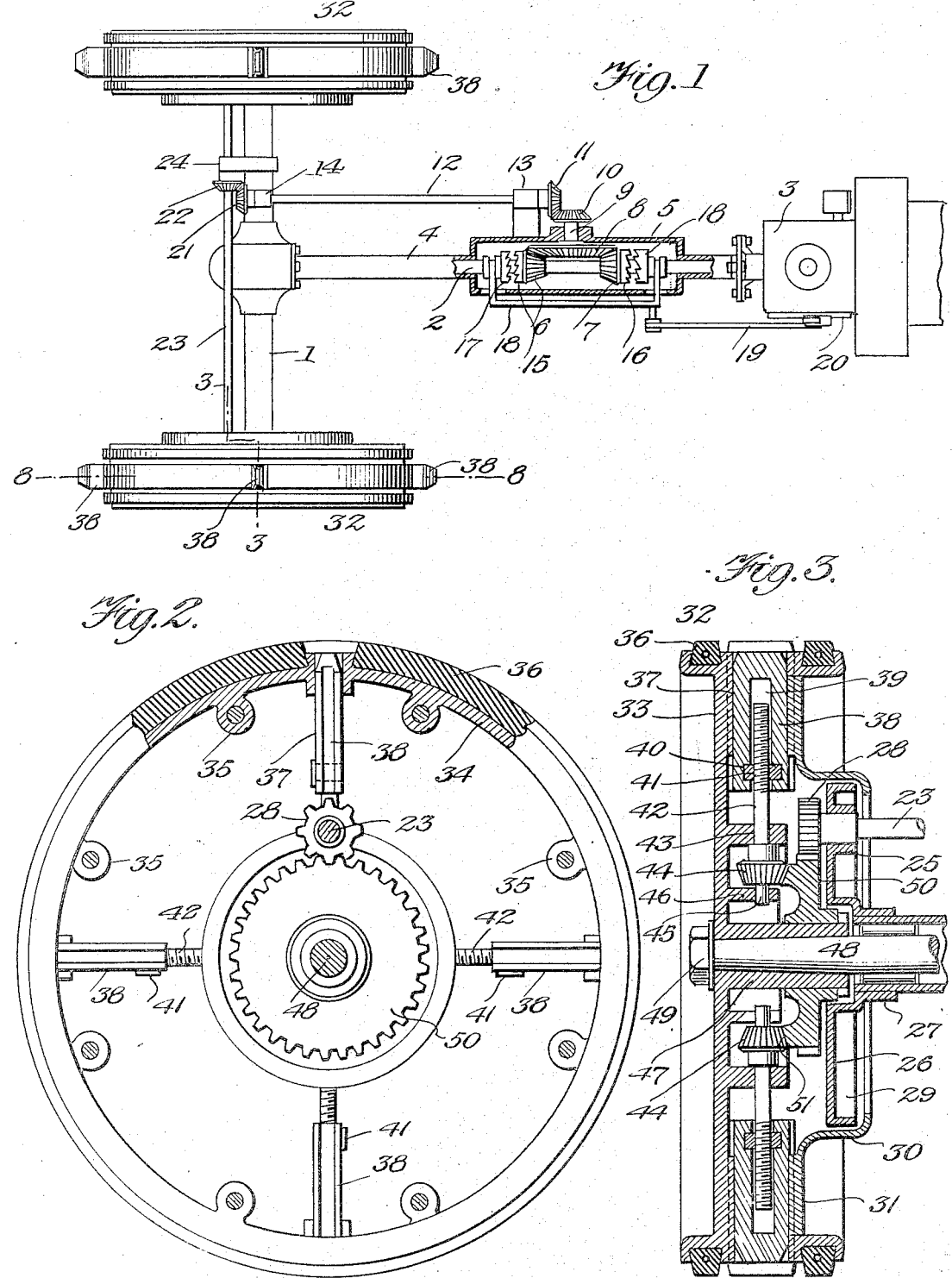
Walter A. Taylor INVENTOR
BY Victor J. Evans ATTORNEY
WITNESS:

April 1, 1924. 1,489,173
W. A. TAYLOR
NONSKID WHEEL
Filed Oct. 25, 1921   3 Sheets-Sheet 2
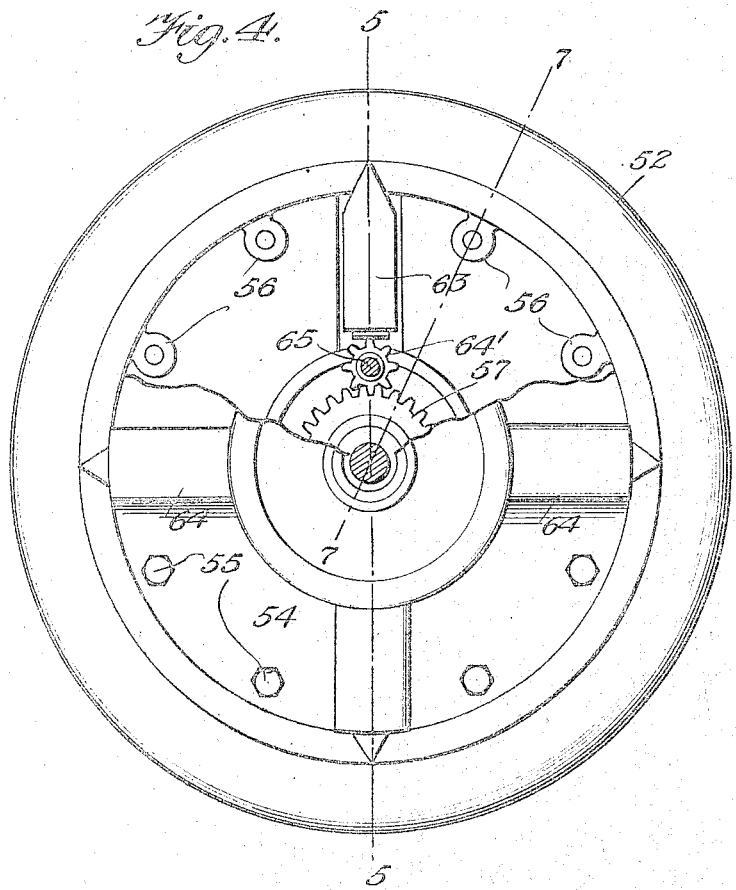
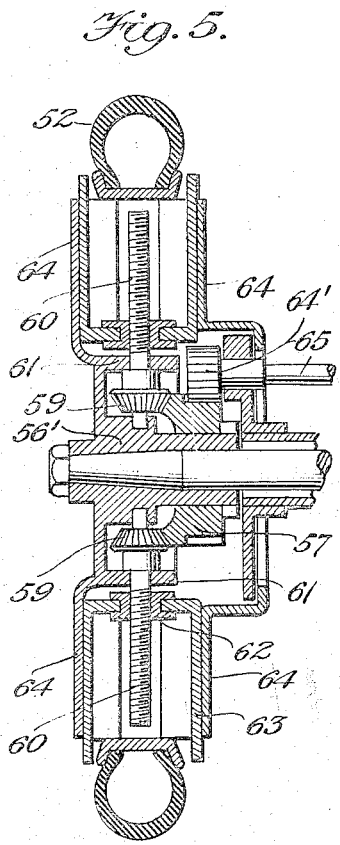
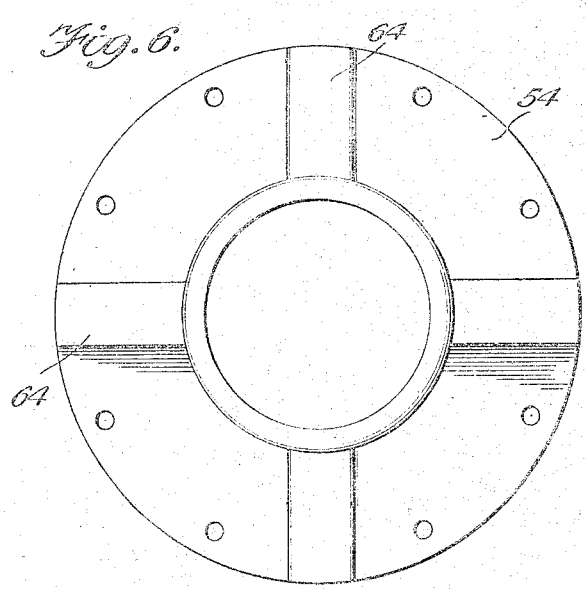
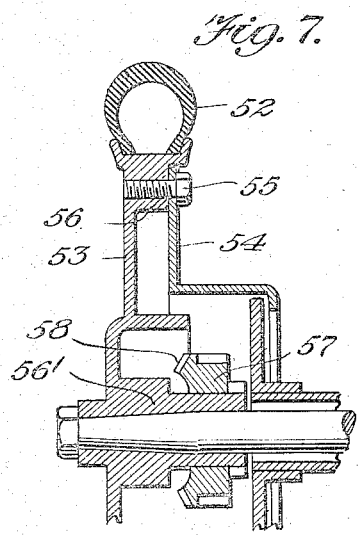
Walter A. Taylor
INVENTOR Patented Apr. 1, 1924.

1,489,173

UNITED STATES PATENT OFFICE.

WALTER ARMTROUN TAYLOR, OF PITTSBURGH, PENNSYLVANIA.

NONSKID WHEEL.

Application filed October 25, 1921. Serial No. 510,199.

*To all whom it may concern:*

Be it known that I, WALTER A. TAYLOR, a citizen of the United States, residing at Pittsburgh, in the county of Allegheny and State of Pennsylvania, have invented new and useful Improvements in Nonskid Wheels, of which the following is a specification.

My present invention has reference to vehicles, particularly motor driven vehicles, and it is my aim to provide the wheels of such vehicles with calks normally disposed inward of the tread surface thereof and which are operated through the medium of mechanism actuated by the driver for projecting the same beyond the tread surface, thus permitting the vehicle to travel over muddy or icy surfaces.

A further object is to provide a vehicle wheel with calks that are normally housed so that their pointed ends are disposed inwardly with respect to the tread surface of the wheels, and wherein means is provided for guiding and simultaneously projecting all of the calks to bring the same into road engaging position, said means also retracting the calks when not required for use.

It is a still further object to construct a vehicle wheel that carries either a pneumatic or solid tire, in a manner whereby the same will have pocketed therein longitudinally movable calks which will be effectively held in the pockets regardless of the vibration or shocks to which the wheel may be subjected, and which may be simultaneously projected through their pockets beyond the tread surface of the wheel and held in such position to engage with the ground surface, and thus increase the traction between the wheel and ground surface.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a top plan view of a portion of a vehicle provided with the improvement, parts being broken away and parts being in section.

Figure 2 is a view looking toward the inner face of one of the vehicle wheels, the face plate being removed, and parts being broken away and parts in section.

Figure 3 is a sectional view approximately on the line 3—3 of Figure 1 upon a greatly enlarged scale.

Figure 4 is an outer face view illustrating the improvement applied to a pneumatic tread wheel and parts being broken away and parts being in section.

Figure 5 is a sectional view on the line 5—5 of Figure 4.

Figure 6 is a plan view of the inner face plate for the wheel.

Figure 7 is a sectional view on the line 7—7 of Figure 4.

Figure 8:
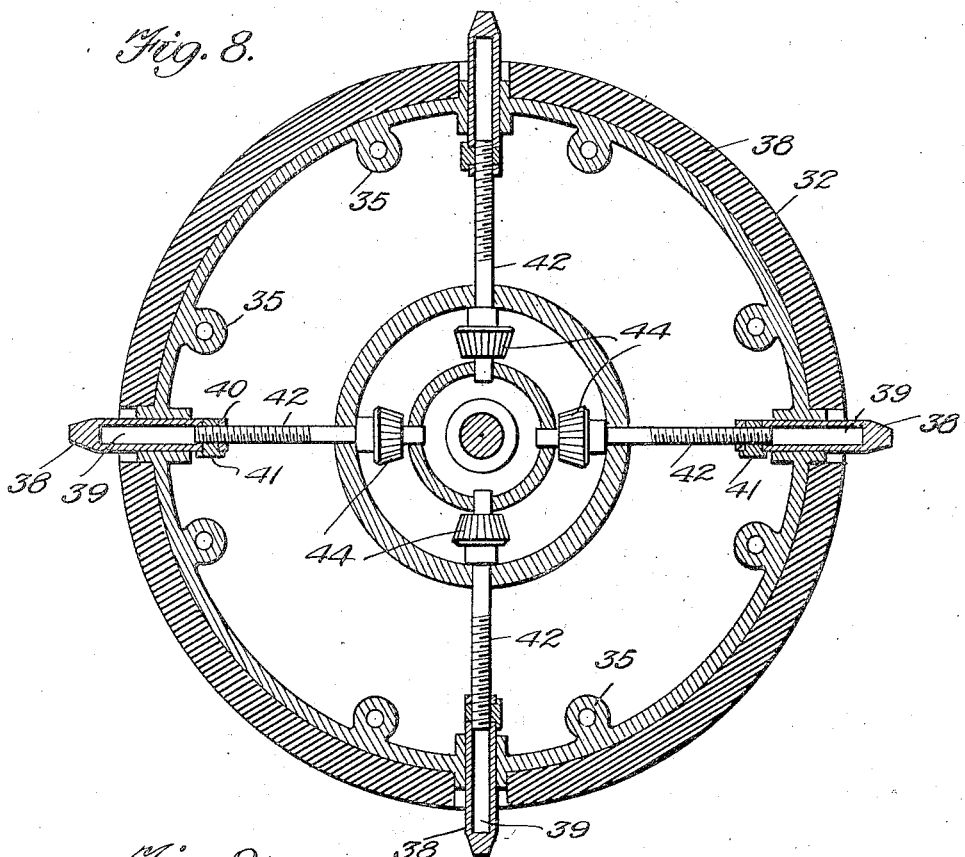
Figure 8 is a section on the line 8—8 of Figure 1.
Figure 9:
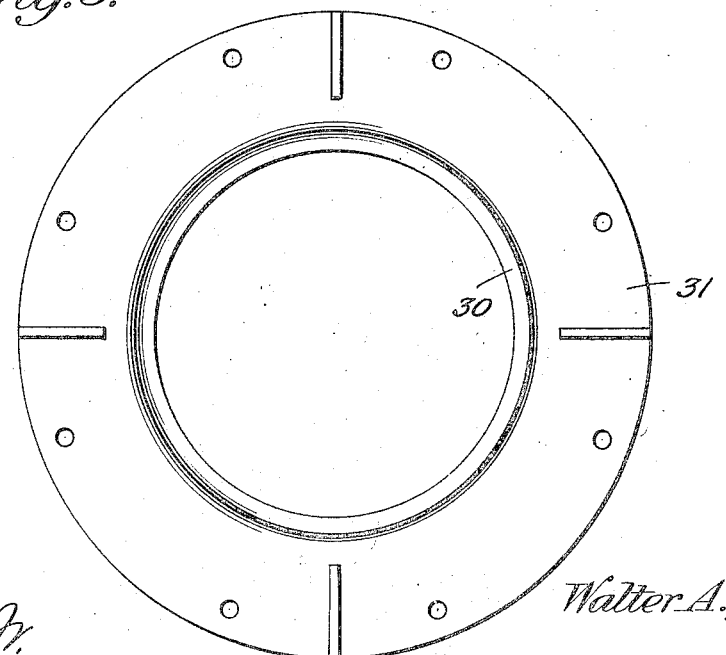
Figure 9 is a plan view of the face plate for the double tread wheel.

Referring now to the drawings in detail, and Figure 1 in particular, the numeral 1 indicates the rear axle housing of an ordinary construction of motor driven vehicles. The axles are driven by the usual differential gears that are encased in the ordinary manner and derive motion from the drive shaft 2 which is connected to the motor 3. In the present instance, the drive shaft tube 4 is constructed of sections that have their confronting ends secured to a casing 5. The drive shaft has loose thereon beveled pinions 6 and 7 respectively which are in mesh with the bevel gear 8 that has its shaft 9 journaled in a bearing boss at right angles to the casing 5 and that has its outer end provided with a pinion 10 that is in mesh with a similar pinion 11 secured on a shaft 12, the latter extending in spaced parallel relation to tube 4 and casing 5 and being mounted in bearings 13 and 14 respectively. It will thus be seen that shaft 12 may be placed in gear with the drive shaft 2 at the will of the driver and the gearing, it will be understood, is of such a nature as to step up the speed of rotation of the shaft 12 relative to the shaft 2 when the calks are to be moved. The bearing 13 is secured to the casing 5, and the bearing 14 is connected to the axle housing 1.

The pinions 6 and 7 have their outer faces provided with cam surfaces 15 and 16 respectively; and keyed for slidable movement on the shaft 2, and arranged in the casing 5 are clutch members 17 and 18 respectively. The clutch members have their hubs provided with annular depressions which are engaged by forks on the arms of an operating element 18'. The arms of the said element pass through suitable slots in the casing. The element 18' is thus substantially U-shaped in plan, and has pivotally connected therewith a link 19 secured to an angle or bell crank lever on one side of the engine casing 3, the said angle or bell crank lever having pivoted thereto an operating rod 20 which may have pivotally connected thereto a lever arranged conveniently to the seat of the driver of the machine, or which may be operated directly by the driver. It will, of course, be apparent that a pull upon the rod 20 will cause the clutch member 17 to engage with the clutch surface 15 of the pinion 6, thus locking the pinion to the gear 8 and revolve the shaft 12 in one direction. Also, when a push is exerted upon the rod 20 the clutch 18 will engage with the clutch surface 16 of the pinion 7, causing the clutch member 17 to be brought out of engagement with the pinion 6 and through the medium of the gear 8 revolve the shaft 12 in an opposite direction. It will be further apparent that when the operating rod 20 is moved to another position, the clutch members 17 and 18 will be out of engagement with the clutch surfaces on the pinions 6 and 7, and consequently the shaft can revolve without influencing the shaft 12.

On the outer end of the shaft 12 there is a bevel gear 21 that is in mesh with a similar gear 22 on a shaft 23 that is arranged parallel with but above the axle housing 1. This shaft may be and preferably is journaled in suitable bearings 24 secured on the housing 1 and has its ends also journaled in bearing bosses 25 on a disk 26 which has a hub portion 27 surrounding and secured to the end of the housing 1. The ends of the shaft 23 have secured thereon gears 28, and the disks 26 have their outer edges formed with flanges 29. The flanges 29 are received in the central flanged portions 30 of the inner and removable face plates 31 for the rear or drive wheels 32 of the vehicle. The outer face plate of each of the wheels is for distinction, indicated by the numeral 33, and the same has, adjacent its periphery, an inwardly directed annular flange 34, provided, at spaced intervals with bosses 35 having threaded bores, and suitable bolts pass through openings in the inner face plate 31 and enter the said bores, thus connecting both plates or sections of the wheel. Each wheel section has a peripheral groove in which is seated a tread or tire 36 respectively. In the present instance, the tires or treads are solid.

The member 33 of the wheels 32, at suitable points between the bosses 35, and at right angles with respect to each other is provided with guides 37 for the slidable calks 38. The calks have their edges ribbed, and the said ribs are received in suitable guide slots in both plates or sections of the wheel. The guides 37 open to the periphery of the wheel between the tread members 36 therefor, and each calk member has a bore 39 that enters from its inner edge, and each bore is provided with a laterally arranged pocket 40 in which is seated a nut 41, suitable means being provided for holding the nuts against turning. Each nut is engaged by a threaded member or screw 42, and the stem of each screw is journaled in openings in inwardly directed lugs 43 upon the outer member 33 of the wheel. Each stem has keyed or otherwise secured thereon a pinion 44, and the portion of the pin projecting beyond the pinion, indicated for distinction by the numeral 45 is received in a bearing opening in a flange 46 also provided upon the outer member 33 of the wheel.

The member 33 of the wheel carries an inwardly directed hub 47 that receives therethrough the drive shaft or axle 48, the axle being keyed therein in the usual manner and the outer end of the axle is engaged by the usual cap nut 49. Free mounted on the hub 47 of each wheel is a toothed wheel 50 that is in mesh with the pinion 28, and each wheel 50 has a gear surface 51 on the outer face thereof, the teeth of which being in mesh with the pinions 44.

The calks are normally housed so that their pointed ends are disposed below the tread surface of the wheels, as clearly illustrated in Figure 2 of the drawings. It will be apparent as previously set forth that the actuation of the operating rod 20 will, through the medium of the clutch and bevel gears cause the turning of the shaft in one of two directions or permit the shaft to idle. Only the said rod is actuated, say to revolve the shaft 12 in one direction to cause the shaft 23 to be revolved to cause the pinions 28 to turn in a direction to revolve the wheel 50 to cause the gear face 51 thereon to turn the gears 45 and likewise turn the stems 42 of the said gears. The calks will be projected to ground engaging surface, and the outward movement of the said calks is simultaneous, and likewise a reverse movement of the parts will seat the calks in their housings.

The above construction refers particularly to Figures 1, 2 and 3. In Figures 4, 5, 6 and 7, a pneumatic tired wheel is employed. The wheel, in this instance has its outer periphery flanged to receive therein the tire 52, but, as in the construction heretofore described, the wheel is made up of two sections which are indicated by the numerals 53 and 54 respectively. However, the flange for the tire 52 is provided only on the outer section 53, the inner section 54 being removably secured to the outer section by bolts 55 which engage in the threaded bores of bosses 56, similar to the bosses 35. The section 53 is provided with an inwardly directed hub 56' on which is free mounted a toothed wheel 57 that has an inner beveled toothed surface 58 to engage with pinions 59 whose stems 60 are threaded but have non-threaded portions that are journaled in bearing openings in inwardly directed flanges 61 on the wheel section 53. The threaded stems 60 engage threaded nut members 62 on substantially U-shaped calks, the sides or arms of the calks being guided in suitable housings respectively on both the inner and outer members or sections 53 and 54 of the wheel. The arms of the calks are disposed to the opposite sides of the pneumatic tread 52, and the wheel 57 is operated by a pinion 64' on a shaft 65, similar to the shaft 23, and the same means for operating the shaft 23 is employed for operating the shaft 65.

While I have illustrated and described satisfactory embodiments of the improvement as it now appears to me, it is to be understood that the nature of the invention is such as to render the same susceptible to changes in material, size, proportion and other details of construction, and therefore I am not to be limited to the devices herein set forth, but am entitled to all such changes therefrom as fall within the scope of what is claimed.

Having described the invention, I claim:—

1. In a motor driven vehicle, the combination with the drive wheel and drive shaft therefor, of calks arranged within the wheels for projection beyond the treads thereof, means actuated by the drive shaft for causing the calks to be projected or retracted, said means including a screw engaging each calk, clutch gears on the drive shaft, a shaft having one end geared to the said screw and the other end geared to the clutch gears, and clutch means for connecting up the said clutch gears with the said drive shaft.

2. A non-skid wheel comprising complementary wheel sections, one of which presents radially disposed guideways opening outwardly thru the tread on one side of the wheel and the other section presenting complements to the guideway which open outwardly thru the tread on the opposite sides of the wheels, U-shaped calks disposed in the said guide ways with the arms of the calks on opposite sides of the tread, and means for simultaneously projecting the calks beyond the tread of the wheels.

3. A non-skid wheel comprising complementary wheel sections respectively presenting opposed radial guideways opening outwardly of the wheels on opposite sides of the tread, one of said sections having an inwardly directed hub, a loose gear mounted on the hub, a plurality of screws fixed to the said hub in alignment with the said guideways, a pinion fixed on each screw and in mesh with the said loose gear, a U-shaped calk arranged in each guideway for projection beyond the tread of the wheel with its arms disposed on opposite sides of the tread, and means for transmitting motion to the loose gear from the drive shaft of a vehicle and including a transmission shaft geared to the pinion of the screw and to the drive shaft, the gearing being of a nature as to step up the speed of the transmission shaft relative to the guide shaft when the calks are to be moved.

In testimony whereof I affix my signature.

WALTER ARMTROUN TAYLOR.